(No Model.)
B. S. DE BALL.
MECHANISM FOR GIVING RECIPROCATING MOTION TO CANVAS.
No. 542,995. Patented July 23, 1895.
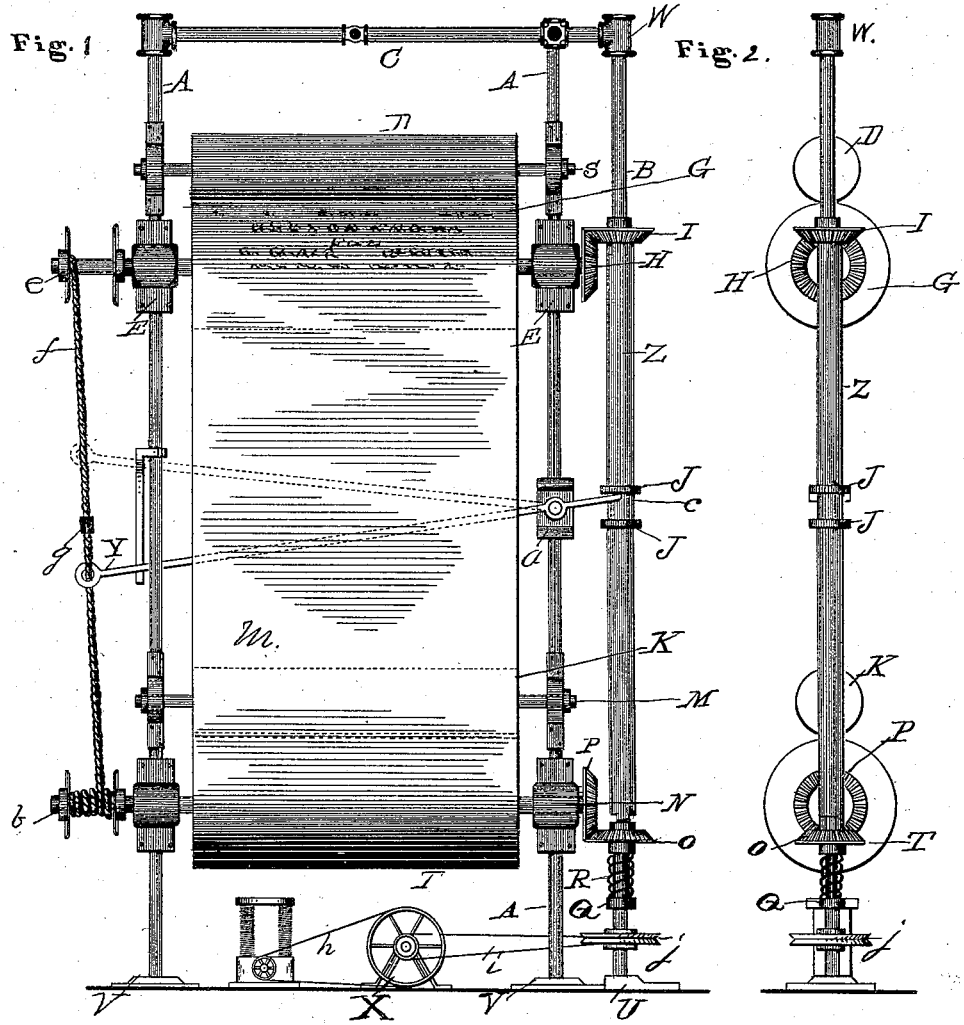
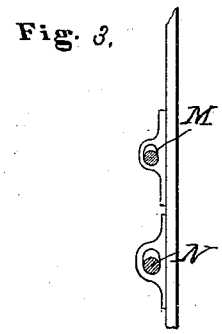
Witnesses.
Fred W. Hersey
H. E. O'Bryan
Inventor
Burton S. De Ball
by G. L. Chapin
his Atty.

UNITED STATES PATENT OFFICE.

BURTON S. DE BALL, OF CHICAGO, ILLINOIS.

MECHANISM FOR GIVING RECIPROCATING MOTION TO CANVAS.

SPECIFICATION forming part of Letters Patent No. 542,995, dated July 23, 1895.

Application filed April 15, 1895. Serial No. 545,725. (No model.)

*To all whom it may concern:*

Be it known that I, BURTON S. DE BALL, a citizen of the United States, and a resident of Chicago, county of Cook, and State of Illinois, have invented new and useful Improvements in Mechanism for Giving Reciprocating Motion to Canvas; and I do hereby declare that the following is a specification, reference being had to the annexed specification, illustrating the invention, in which—

Figure 1 is a side elevation of a mechanism in which my invention is embodied. Fig. 2 is an elevation of the right-hand end of Fig. 1. Fig. 3 shows the form of slotted bearings to the lower rollers.

The purpose of this invention is to provide simple and certain means for giving to a belted canvas or rollers a reciprocating motion for the display of matter on the canvas. It is not new to give to such a canvas a reciprocating motion; but the construction of the apparatus I employ, the means for supporting the canvas, and the means for reversing the canvas and holding the canvas flat to the rollers during the period of its reversal thereon have not been before used.

A A are the two main posts of the frame of the apparatus. These posts are connected at the top by a cap-pipe C and at the bottom by sill-supports V V. The posts A A support suitable bearings for rollers D K, and bearings E N for the drums G T. The canvas m is rolled on said drums, and said rollers D K by gravity press the canvas to the drums. By means of a coupling W and a suitable step U a post-shaft B is provided with suitable stationary bearings at one side of one post A. A bevel-gear I is securely attached to a collar which is loose on the shaft-post B, and the lower portion of the collar is toothed to engage like teeth on the upper portion of a cylindrical sleeve Z, surrounding the main portion of post-shaft B. From the post-shaft projects one or more pins, which the teeth on the upper portion of the sleeve engages when the sleeve drives the collar of the pinion-gear I. The gear H, on the shaft of drum G, supports the weight of gear I. A gear-wheel O is supported by a loose collar on post-shaft B, and the upper portion of the collar is toothed to engage like teeth on the lower end of the sliding sleeve Z, and one or more pins are affixed to the shaft B for the lower teeth of the sleeve Z to engage when the post-shaft B is to turn the gear O. The gear O is supported by a coil-spring R, which surrounds the shaft B, has a bearing on a ring Q, affixed to the shaft, and a bearing against the under side of the collar of gear O. This construction is such that when the post-shaft B is driving the gear I to the right hand the drums move to the right hand, and the now loose pulley O is turning toward the left hand. When the post-shaft is reversed to engage the collar of gear O, the canvas m runs to the left and the now loose gear I runs also to the left. The means for raising and lowering the sleeve Z consists of a lever C Y, forked or otherwise, and constructed to pass onto the sleeve Z and between the fixed rings J J. This lever is pivoted to the post A at $a$ and extending to and by means of a ring or loop engaging cord $f$. This cord is alternately wound on drums $e$ and $b$ by the reciprocating rotating motion of the drums, and on the cord at the proper places are affixed two stops, one of which is shown at $g$, one stop engaging the end Y of the lever C Y to elevate the lever and the other stop to depress it. This operation is automatic and is caused by the ring J J operating the end C of the lever. The bearing to the shafts N of the drum T and of roller M are vertically slotted, so that the drum may settle a little at the reversal of the canvas and prevent a kink thereon, and the spring is also employed to relieve the downstroke of the sleeve Z, the sleeve having some weight, and otherwise it would come in contact with the collar of gear O with undue force.

The apparatus can be driven by the wheel $j$, cords $b$ $n$ $l$, and wheel $x$ or by other suitable means.

I claim and desire to secure by Letters Patent of the United States—

Improvement in mechanism for giving motion to canvas, consisting of the posts A, A, supporting the bearings to the shafts to the drums G, T, rollers D, K, the slotted bearings to the shafts M, N,—slotted as shown, the post-shaft B, the sleeve Z, provided with toothed ends and the rings J, J, in combination with the toothed collars to the gears I and O, the gears N, P, the lever C, Y, the cord $f$, drums $e, b$, and stops $g$, as and for the purpose specified.

BURTON S. DE BALL.

Witnesses:
G. L. CHAPIN,
C. C. MARCH.